Dec. 19, 1939.    R. D. CLEMSON    2,183,545
MOWER
Filed June 18, 1937

INVENTOR
RICHARD D. CLEMSON.
BY
ATTORNEYS

Patented Dec. 19, 1939

2,183,545

UNITED STATES PATENT OFFICE 2,183,545

MOWER

Richard D. Clemson, Middletown, N. Y., assignor to Clemson Bros., Inc., Middletown, N. Y., a corporation of New York Application June 18, 1937, Serial No. 148,837

8 Claims. (Cl. 56—294)

This invention relates to a mower or like device, and particularly to mowers of the rotary reel type in which spiral fly knives on a rotary reel contact with a straight bed knife to form a shear progressing from end to end of each of the blades in turn.

Prior to my invention, mowers of this type, particularly as lawn mowers, have become standard and are in almost universal use. As commonly constructed such mowers use a rigid bed knife adjusted at each end by a pair of opposed screws so as to bring it into accurately determined pressure relation to the knives of the reel. It has been common practice in many cases to form such rigid bed knives with lips to absorb the wear at the point where it occurs, without increasing the thickness of the bed knife throughout its width. It has also been suggested to replace this rigid bed knife with a spring blade; and it has even been suggested to provide integral lips on the edges of more or less resilient blades to increase their useful life by absorbing wear at the point where it occurs.

I have now found that the use of a properly formed lip on the edge of a spring blade may be made to serve other and novel functions more important than that of absorbing wear; and, in order that these may be made commercially available, I have, by my present invention, provided for the formation of such a lip in simple and economical manner.

In an extensive series of experiments and tests with spring blade bed knives in rotary reel mowers I have found that when the blade is made sufficiently flexible to fully attain the important advantages of the spring type blade such blades are subject to serious disadvantages which have heretofore interfered with their commercial use.

In the first place, I have found that with the more flexible blade there is a tendency for the blade to form a U-bend or depression under the fly knives where the latter contact the edge of the blade. When the reel rotates, the fly knives must push this depression longitudinally along the spring blade, and this introduces a serious resistance to the rotation beyond that due to simple friction and this must be overcome by additional power applied to the mower.

In the second place, it has been found that when a substantial obstruction, such as a stick or a stone, is engaged between the fly knives and the resilient bed knife at one point the shock is absorbed almost entirely at that point and in the closely adjacent portions of the spring blade; and for this reason it has proven extremely difficult to provide at the same time the desired flexibility and the necessary resistance to such obstructions. If the blade is made sufficiently heavy and rugged to withstand these sudden shocks caused by stones and nails and the like, it lacks the resilient flexibility desired in many cases.

By making the edge of such a bed knife substantially inflexible to the forces encountered in normal operation, I have found that it is possible to avoid these disadvantages and at the same time to provide any desired flexibility of the bed knife blade. Since the edge itself is inflexible, the spiral fly knives progress longitudinally along it as a straight edge precisely as though the entire bed knife were rigid, and there is no longer the resistance to rotation formerly caused by bending of the spring blade. When an obstruction strikes between the fly knife and the edge of the blade the entire blade must be depressed simultaneously, and without longitudinal flexing, because of the rigidity of the edge. Thus, as compared with the older flexible blades, the effect is as though many springs were acting simultaneously. Consequently, without reducing the resilient flexibility of the blade, and with substantially the same resilient pressure on the edge of the blade during normal cutting a greatly multiplied resistance to any such obstruction can be obtained, because the spring blade acts against the obstruction simultaneously throughout its entire length; and because its amplitude of flexibility is unchanged by the rigid edge, such a blade permits the stalling of the mower before the limit of elasticity of the blade is reached, as more particularly described and claimed in my co-pending application, Serial No. 52,757, filed December 4, 1935.

Another very important advantage of the construction is found when such a bed knife is combined with a reel having a spiral blade of pitch and spacing such that each fly knife slightly overlaps the opposite end of the second fly knife beyond it in the reel. Thus, at any position of the reel during its rotation the bed knife is always in contact with at least two of the fly knives thereby definitely determining its position throughout its length; and at the point at which the end of one knife is about to enter over one end of the bed knife, the bed knife is held down by contact with the middle of the preceding blade and the opposite end of the second preceding blade. Thus clashing of the fly knives and the bed knife at the point of entrance is avoided, whereas, without the rigid edge, there would be a tendency for the resilient blade to spring back at its free end into the path of the entering fly knife, and special means would be required, as has always been the case in the prior art, to assure the entry of the leading corner of the fly knife without clashing against the bed knife.

Obviously, other means for guiding the leading corner of the fly knife over the bed knife may be used, but it will be found that these are not essential any more than with properly adjusted rigid bed knives, since the rigid edge of the bed knife contacting with the fly knife at two points on the reel definitely and accurately determines the position of the end over which the leading corner of the entering fly knife must pass.

The simplest way in which this rigidity of the edge may be attained is by bending upward substantially at right angles, and preferably into a plane radial of the axis of the reel, a narrow margin adjacent the edge of the resilient strip of which the bed knife is formed. This rectangular bend places this narrow marginal portion edgewise towards the reel and thus gives to the edge of the blade a rigidity against any longitudinal bending.

Another construction which I have found simple and particularly advantageous is to weld or otherwise secure to the edge of the flexible strip a rigid, advantageously an L-shaped, narrow strip of a hard wear-resisting material, as for example, tungsten-, molybdenum- or manganese-steel, etc., designed particularly for wear-resisting qualities and hardness. The edgewise support of the flexible resilient strip prevents fracture of the harder wear-resisting strip while the latter gives to the edge the desired flexibility.

In the accompanying drawing I have illustrated these constructions and their application in mowers of standard type as well as of the improved type more particularly described and claimed in my copending applications. I have chosen these preferred examples with a view to explaining and illustrating my invention and the principles thereof and the best manner of applying it to practical use. It is to be understood, however, that these are not intended to be exhaustive nor limiting of the invention, but on the contrary this drawing and the present specification are intended to instruct others skilled in the art so fully that they will be enabled to modify the invention and embody it in numerous and varied forms, each as may be best suited to the requirements of any particular use.

Figure 1:
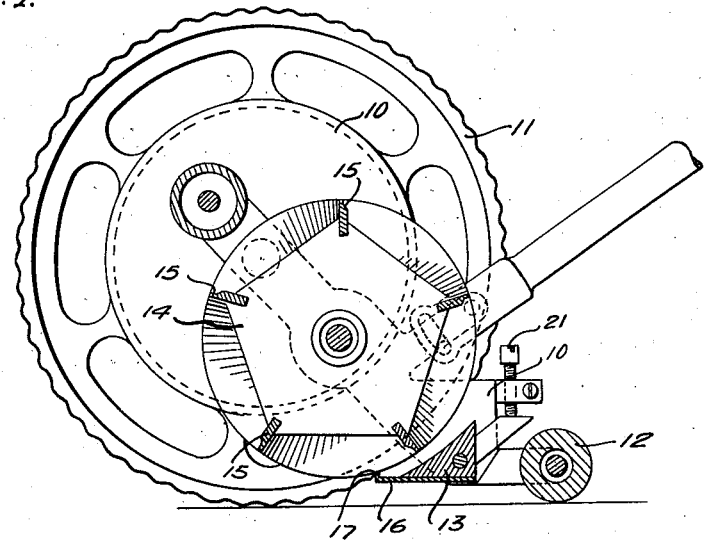
Fig. 1 is a view in cross section of a preferred embodiment of my invention.

Referring first to Fig. 1, the mower there shown comprises a frame 10 on which are mounted the drive wheels 11, the ground roller 12, an adjustable cross member 13, constituting a rigid back or frame for the bed knife, and the reel 14 having spiral fly knives 15. Secured to the frame member 13 is the flexible bed knife 16, on the free edge of which is formed a lip 17 by which the edge is made substantially inflexible. An adjusting screw 18 controls the angular position of the cross frame member 13 and thereby controls the initial deflection of the operating pressure of the bed knife against the reel.

In the case shown, the bed knife strip 16 is about two inches in width, of which approximately one inch is freely extended beyond the rigid backing member 13. The stock of which this is made is advantageously about 18 gauge spring steel, and the lip turned up at approximately right angles extends about 0.1 inch above the upper surface of the remainder of the blade.

In the operation of this mower the screw 18 is set up until the edge of the blade is pressed against the fly knives of the reel with a pressure sufficient to effect the minimum desired cut. In this adjustment the blade is flexed to some degree and follows, therefore, accurately the irregularities of the fly knife giving an efficient and sharp cut. Each time a new fly knife enters over a corner of the blade the corresponding edge of the bed knife is held at the required position to permit such entry of the fly knife by virtue of the fact that it is in pressure contact with two points on the reel, namely, the opposite end of the second preceding fly knife and a point near the middle of the next preceding fly knife. Advantageously the point of contact on the next preceding fly knife is somewhat nearer to the entering point than the exact middle of the reel in order to avoid any danger that the bed knife might twist toward the entering point. This may be accomplished either by making the spiral of the fly knives on somewhat shorter pitch near the entering end than at the opposite end, or by increasing the amount of overlap. Such expedients, however, are ordinarily not necessary and it will be found that the desired result is attained even if the preceding fly knife contacts exactly at the center or even somewhat beyond the center.

Figure 2:
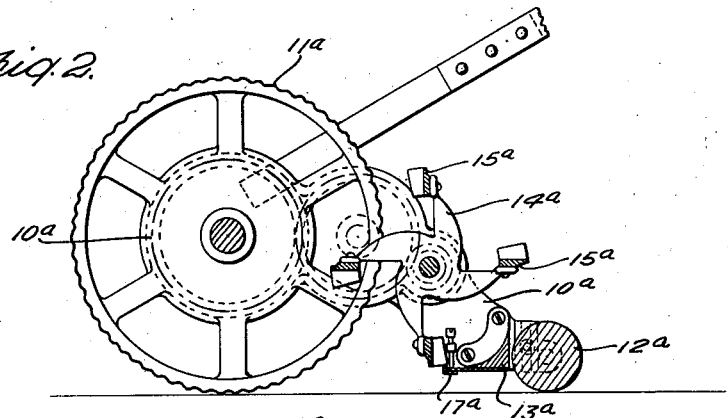
Fig. 2 is a similar view of my invention applied to standard commercial type mowers.
Figure 3:
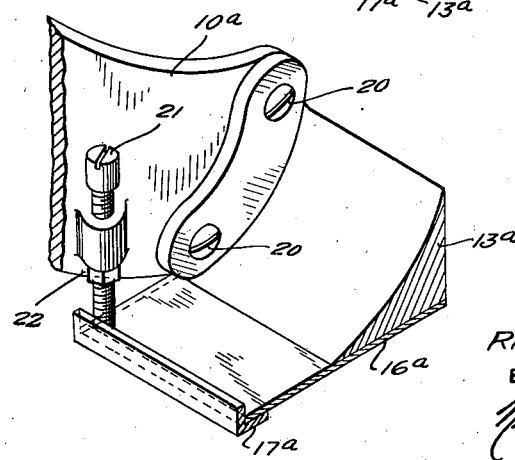
Fig. 3 is a fragmentary view partly in perspective and partly in section of the bed knife shown in Fig. 2.

In Figs. 2 and 3 I have shown my invention applied in a somewhat different embodiment. The mower structure in general in this case corresponds to a type of mower which has been on the marked and in common use for a good many years and will, therefore, need no detailed description. For purposes of comparison with the structure of Fig. 1, I have indicated corresponding parts by corresponding numbers with the addition of the letter *a* where these parts are of altered design.

In this embodiment of Figs. 2 and 3 a rigid back 13a has been provided for the spring blade bed knife 16a similarly, to this extent, to the construction shown in Fig. 1. In the second case, however, the rigid back 13a is rigidly secured to the frame 10a, e. g., by means of the screws 20 and the resilient pressure of the spring blade bed knife 16a is relied upon entirely to maintain the shearing contact, without manual adjustment. Since in the absence of adjusting means it is more important to avoid wear on the edge of the bed knife, a separate rigid edge member 17a of wear resisting steel is provided in this case and is secured to the edge of the spring blade 16a, e. g., by spot welding.

A stop screw 21 may be provided, as shown, and as more fully described in my copending application Serial No. 52,757 filed December 4, 1935, in order to hold the end of the bed knife away from the reel for entrance of the corner of the fly knife over the edge 17a. This, however, as already stated above, will be unnecessary if the reel is designed to maintain constantly at least two widely spaced points of contact so that the edge 17a is held depressed for the entering corner of a fly knife by the contacting edges of the preceding fly knife.

This application is a continuation in part of my prior application, Serial No. 52,757, filed December 4, 1935.

What I claim is:

1. A lawn mower comprising a frame, a rotating reel mounted thereon and having spiral fly knives, and a bed knife; and which is characterized by its bed knife comprising a resilient metal strip secured to a longitudinally rigid frame member at a distance from the reel, said strip being resiliently flexible away from and toward the reel with an amplitude more than twice its thickness but having a lip adjacent its shearing edge which is adapted to render said edge inflexible.

2. A lawn mower comprising a frame, a rotary reel mounted thereon, having spiral fly knives, and a bed knife in shear contact with said reel, which bed knife comprises a resilient metal strip secured at a distance from the reel to a longitudinally rigid frame member and at an angle such that its opposite edge is pressed against the reel and its intermediate width is subjected to resilient distortion of amplitude at least equal to the thickness of the metal strip and said strip having a stiffness adapted to hold the shearing engagement of the bed knife edge at least against the lighter materials to be cut by said device, and a lip on the shearing edge of said strip adapted to make it substantially rigid against flexing by the fly knife, whereby the edge must remain straight and move bodily when the resilient strip is flexed.

3. A mower as defined in claim 1, which is further characterized in that the end of each spiral fly knife overlaps, angularly about the reel axis, the opposite end of the second fly knife therefrom.

4. A mower as defined in claim 1, which is further characterized in that the end of each spiral fly knife overlaps, angularly about the reel axis, the opposite end of the second fly knife therefrom, and the spiral edges of the fly knives are so formed that the line defined by the cutting edge of the bed knife passes over the leading end of each fly knife in turn when it intersects the cutting edges of the next two preceding fly knives.

5. A mower as defined in claim 1, which is further characterized in that the end of each spiral fly knife overlaps, angularly about the reel axis, the opposite end of the second fly knife therefrom, and the straight line from the edge at the end of the first named fly knives in a plane radial to the axis of the reel and through the edge of the next fly knife passes the edge of said second fly knife at a point radially outward therefrom.

6. A mower as defined in claim 1, which is further characterized in that the end of each spiral fly knife overlaps, angularly about the reel axis, the opposite end of the second fly knife therefrom, the spiral of the fly knives has a shorter pitch in the leading end thereof than in the opposite end, whereby when opposite ends of an entering and a leaving fly knife are over the bed knife, it will contact the intermediate fly knife nearer to the entering than to the leaving end.

7. A lawn mower as defined in claim 2, in which the lip on the bed knife is a bar of harder metal than the resilient strip and substantially thicker in cross section than said strip and secured to the outer edge of the strip.

8. A lawn mower as defined in claim 2, in which the lip on the bed knife is formed by bending a narrow border of the resilient strip upward into a plane approximately radial to the reel axis.

RICHARD D. CLEMSON.